United States Patent

Petrova

[11] 3,825,222
[45] July 23, 1974

[54] CHARGING PIPE UNION

[76] Inventor: Nina Vladimirovna Petrova, Leningradsky Prospekt 5, kv. 152, Moscow, U.S.S.R.

[22] Filed: June 8, 1972

[21] Appl. No.: 260,735

[52] U.S. Cl. .......................... 251/149.6, 137/516.29
[51] Int. Cl. ................................................ F16l 29/00
[58] Field of Search ...... 137/223, 224, 516.29, 541, 137/614.04; 251/149.6, 149.7, 332, 357, 358

[56] References Cited
UNITED STATES PATENTS

| | | | |
|---|---|---|---|
| 2,173,295 | 9/1939 | Coles et al. | 251/149.6 X |
| 2,619,316 | 11/1952 | Wilson | 137/541 |
| 2,675,021 | 4/1954 | Allin | 137/516.29 X |
| 3,419,040 | 12/1968 | Thibodeaux | 137/516.29 X |
| 3,460,805 | 8/1969 | Kudlaty | 251/357 |
| 3,508,576 | 4/1970 | Gross | 251/358 X |

*Primary Examiner*—William R. Cline
*Attorney, Agent, or Firm*—Waters, Roditi, Schwartz & Nissen

[57] ABSTRACT

A charging pipe union comprising a body with an axial through passage having from the side of an apparatus being charged a tapered seat which is to be covered by a spring-loaded check valve shaped like a truncated cone, the valve being made integral with a pusher located within the passage of the body. An elastic sealing ring, attached to the check valve, is made with a truncated cone shape, having its larger base facing the check valve. The sealing ring is provided with a rounded portion touching the tapered seat under some preloading pressure to assure sealing of the check valve, while a smaller base of the ring is made rigid.

1 Claim, 3 Drawing Figures

3,825,222

CHARGING PIPE UNION

The present invention relates to general-purpose valve devices and more specifically it relates to charging pipe unions.

The present invention can be used in various branches of the industry, for example in the aircraft industry, in the system of charging shock struts of aircraft landing gear with compressed gas and in the automotive and gas industries in the function of shut-off fittings in pneumatic and hydraulic systems, particularly where the long and dependable service of these fittings is of vital importance.

Known in the art are charging pipe unions comprising a body with a through passage accommodating a pusher, one end of which is provided with a compression spring while the other end carries a tapered check valve stopping the passage in the body, and a sealing ring made in the form of a truncated cone adjoining said valve, placed on the valve extension and secured by a nut.

The known pipe unions are sealed along the tapered surface of said sealing ring contacting the tapered seat in the passage of the valve body. On opening of such a valve the sealing ring is deformed by a high pressure, its material "flows" into the gap formed between the valve and the seat, and is gradually destroyed during opening and closing of the valve. The valves of this type render efficient service only at pressures not exceeding 5 kg/cm².

Also known in the art are structures aimed at the elimination of these disadvantages. For example, there exists a valve installed on a gas or liquid pipeline which employs a sealing ring with a T-shaped cross section. The larger base of said ring fits against the valve base while its upper part is provided with a metal bushing pressing the ring against the stem on which it is mounted.

However, in the seal of such a shape the edges of the larger base are also subjected to damage or deterioration while in service, and the valve loses its serviceability.

An object of the present invention is to provide a charging pipe union with a sealing ring which seals a valve reliably under the repeated effect of a pressure differential up to 250 kg/cm², a dynamic load up to 700 kg/cm² and at ambient temperatures from −60°C to +80°C.

This and other objects are accomplished by providing a charging pipe union which comprises a body with an axial through passage accommodating a spring-loaded pusher which has a tapered check valve closing said passage at the end thereof, and has a sealing ring shaped like a truncated cone.

According to the invention, the sealing ring adjoins the valve face with its larger base having a rounded portion which touches the tapered seat and has a rigid smaller base.

The smaller base of the sealing ring can be made rigid by a metal washer vulcanized on it which prevents its deformation.

Such a solution improves considerably the reliability of the charging pipe union and extends its life under the above-specified conditions of service, i.e., at pressures up to 700 kg/cm² and temperatures ranging from −60° to +80°C.

Now, the invention will be described in detail with reference to the accompanying drawing in which.

Figure 1:
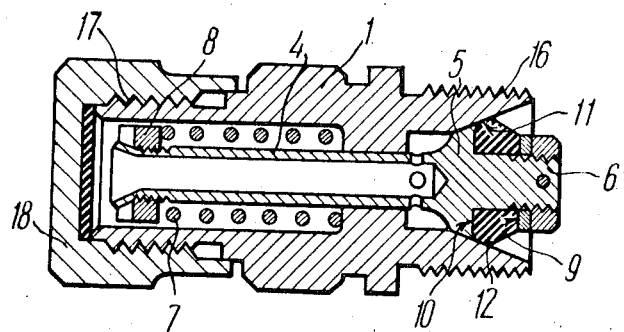
FIG. 1 is a horizontal section of a charging pipe union according to the invention.

Referring to FIG. 1, the charging pipe union comprises a body 1 with an axial through passage 2 having a tapered seat 3 at the end. The seat 3 is blocked by a tapered check valve 5 having a taper angle just the same as the seat has, the valve being made integral with a hollow cylindrical pusher 4 passing through an aperture in an annular shoulder 20 which is provided inside the body 1.

The pusher 4 is made with through passages 19 radially arranged therein and communicating an inner space 21 of the pusher to the tapered seat 3.

The pusher 4 carries thereon a free-mounted cylindrical compression spring 7, one end of which bears against the annular shoulder 20 while the other end bears against a stopping bushing 8 mounted on the threaded free end of the pusher 4 which is rolled to a splined split being provided at the end surface 22 of the bushing 8 to fix the latter rigidly.

The valve 5 is sealed by an elastic, e.g. rubber sealing ring 9 made in the form of a truncated cone, placed on a shank 6 integral with the valve 5. The sealing ring 5 adjoins with its larger base 10 the face of the valve 5.

According to the invention, said base 10 of the sealing ring 9 is provided with a rounded portion 11 touching under some preloading pressure the tapered seat 3 to assure sealing of the check valve 5. In the considered exemplary embodiment of the pipe union this rounded portion follows the arc of a circumference.

To assure the centering and rigidity of the sealing ring 9, its smaller base 12 is made rigid by a vulcanized metal washer 13. The ring 9 together with the washer 13 is secured on the shank 6 by means of a nut 14 having a splint 15.

Figure 2:
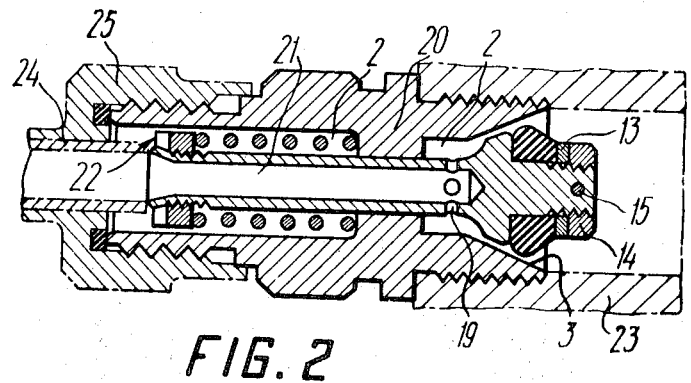
FIG. 2 is a horizontal section of the charging pipe union and shows the same in a chraging position communicating at one end with an apparatus being charged and at the other end with a supplying pipeline.
Figure 3:
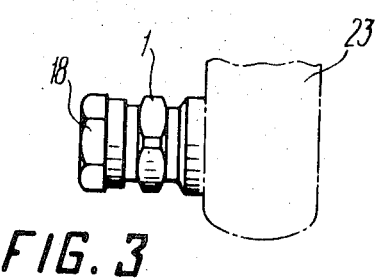
FIG. 3 represents a general view of a charging pipe union installed on a shock strut of an aircraft landing gear.

The body is externally provided with threads 16 made at one end thereof for connecting the pipe union to a shock strut of an air-craft landing gear (FIG. 2), while the other end has threads 17 for screwing on a safety cap 18 as soon as a supplying pipeline 24 of a charging apparatus 25 is disconnected from the pipe union.

The charging pipe union functions as follows. After removing the safety cap 18, the pipeline 24 of the charging apparatus 25 is connected to the pipe union, the pipeline end presses the pusher 4 and the latter overcomes the pressure of the spring 7 and moves to the right (according to the drawing, FIG. 2), whereby a clearance is formed between the seat 3 of the body 1 and the valve 5. The liquid or gas from the charging apparatus flows through the inner space 21 of the pusher 4 and the passages 19 in the pusher to passage 2 of the body 1, from where it passes through the clearance between the valve 5 and the seat 3 into the apparatus under charge, in this case into the chamber of the aircraft shock strut 23.

At the initial moment of charging, when pressure in the chamber of the shock strut 23 is considerably higher than that in the supplying pipeline 24, the sealing ring 9 is subjected to the effect of a high pressure (up to 250 kg/cm$^2$). However, due to the fact that said ring 9 in the pipe union according to the invention has a rounded edge on the larger base 10 and a rigid smaller base 12, this prevents deformation and deterioration of said ring, thereby improving the reliability of the pipe union as a whole and broadening the field of its application.

What is claimed is:

1. A charging pipe union comprising: a body secured to an apparatus being charged; a through axial passage in said body, said passage having a circular shoulder therein and a conical seat tapering outwardly toward the apparatus and positioned at the end of the body which is secured to the apparatus; a check valve mating with said seat to block said passage; a hollow cylindrical pusher integral with said valve and passing through an aperture in said shoulder, said pusher having through passage means communicating a space inside thereof to said seat for providing flow of a liquid or gaseous medium from a supply pipeline connected to an end of said pusher opposite said valve in one direction to the apparatus when said valve is opened, and in the opposite direction to drain an excessive amount of the medium from the apparatus; a stop provided at said end of the pusher; a spring positioned on said pusher so that one end thereof abuts against said shoulder within said passage, and the other end abuts against said stop; said valve being shaped like a truncated cone having the same taper angle as said seat of the passage; an elastic sealing ring having a truncated cone configuration attached to said valve with the large base thereof facing said valve, said ring having a rounded portion at the large base touching said seat under preloading pressure, to assure sealing of said valve; said ring having a rigid securing portion; and a safety cap adapted to be mounted on said body from the side opposite to that where the apparatus is charged after the charging cycle is completed.

* * * * *